United States Patent
Miyata

(10) Patent No.: US 8,922,593 B2
(45) Date of Patent: Dec. 30, 2014

(54) IMAGE DIVISION PROCESS AND DISPLAY APPARATUS

(75) Inventor: Yuko Miyata, Ama-gun (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 147 days.

(21) Appl. No.: 13/398,807

(22) Filed: Feb. 16, 2012

(65) Prior Publication Data

US 2012/0206489 A1 Aug. 16, 2012

(30) Foreign Application Priority Data

Feb. 16, 2011 (JP) ................................. 2011-031085

(51) Int. Cl.
*G06F 3/0488* (2013.01)
*G06F 3/0481* (2013.01)

(52) U.S. Cl.
CPC ........ *G06F 3/04883* (2013.01); *G06F 3/04886* (2013.01); *G06F 3/0481* (2013.01)
USPC ........................................................ 345/650

(58) Field of Classification Search
USPC ................................................. 345/650, 715
See application file for complete search history.

(56) References Cited

U.S. PATENT DOCUMENTS

| | | | |
|---|---|---|---|
| 6,326,978 B1* | 12/2001 | Robbins ..................... | 345/654 |
| 2002/0191201 A1* | 12/2002 | Kimbell et al. .............. | 358/1.2 |
| 2006/0262144 A1* | 11/2006 | Harris ........................... | 345/649 |
| 2007/0222769 A1 | 9/2007 | Otsuka et al. | |
| 2007/0252779 A1* | 11/2007 | Nishiyama et al. .......... | 345/1.1 |
| 2007/0279420 A1* | 12/2007 | Ichikawa ...................... | 345/501 |
| 2008/0165141 A1* | 7/2008 | Christie ........................ | 345/173 |
| 2009/0027419 A1* | 1/2009 | Kondo et al. ................. | 345/649 |
| 2009/0251408 A1* | 10/2009 | Kuroda ......................... | 345/156 |
| 2009/0256857 A1* | 10/2009 | Davidson et al. ............ | 345/619 |
| 2010/0002138 A1* | 1/2010 | Chen et al. ................... | 348/564 |
| 2010/0097338 A1* | 4/2010 | Miyashita et al. ............ | 345/173 |
| 2010/0111429 A1* | 5/2010 | Wang et al. .................. | 382/233 |
| 2010/0115455 A1* | 5/2010 | Kim ............................. | 715/781 |
| 2010/0299630 A1* | 11/2010 | McCutchen et al. ......... | 715/803 |
| 2011/0176166 A1* | 7/2011 | Sawamura ................... | 358/1.15 |

FOREIGN PATENT DOCUMENTS

| | | |
|---|---|---|
| JP | 2001298649 A | 10/2001 |
| JP | 2006126401 A | 5/2006 |
| JP | 2007257220 A | 10/2007 |

* cited by examiner

*Primary Examiner* — David Zarka
*Assistant Examiner* — Terrell Robinson
(74) *Attorney, Agent, or Firm* — Banner & Witcoff, Ltd.

(57) ABSTRACT

An image may be divided into multiple portions or sub-images using division lines. To facilitate this process, the division lines may be drawn with user input in a single direction. The image may then be rotated to allow a user to draw lines extending in other directions using the same user input direction. In some instances, rotation may be automatically performed upon drawing of a division line, deletion of a sub-image, receiving a specified user command or type of user input and the like. Additionally or alternatively, upon rotating the image a first time in one direction, a subsequent rotation of the image may be performed in an opposite direction. The first rotation and the subsequent rotation may be of the same rotation amount. If a sub-image is deleted, a remaining sub-image or sub-images may be resized or otherwise modified to fit within the display.

15 Claims, 11 Drawing Sheets

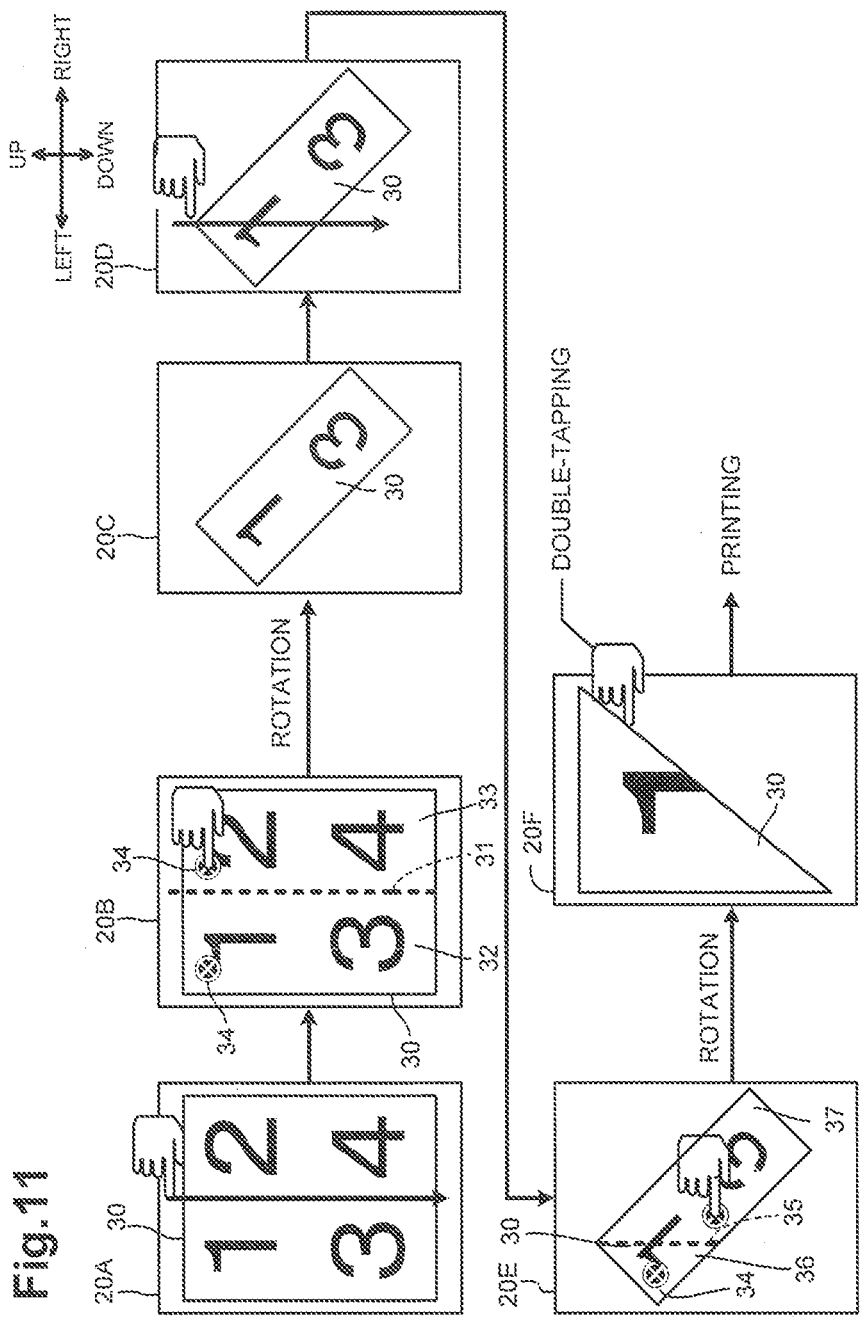

IMAGE DIVISION PROCESS AND DISPLAY APPARATUS

CROSS REFERENCE TO RELATED APPLICATION

This application claims priority from Japanese Patent Application No. 2011-031085 filed on Feb. 16, 2011. The entire content of each of this priority application is incorporated herein by reference.

BACKGROUND

1. Technical Field

The present invention relates to a technology to divide an image into multiple sub-images in response to an operation on a touch panel.

2. Description of the Related Art

A technology in related art is known to divide a screen into two sub-screens with a division line, which, for example, may be a straight path from a start point of a slide operation to an end point thereof, and to display the same image as the one before the division on one of the sub-screens and display a new image on the other sub-screen. The slide operation is an operation in which a user touches a touch panel provided on a display apparatus with his/her finger.

BRIEF SUMMARY

In the processes described above, however, only one division line may be set and an ability to divide a screen into three or more sub-screens with two or more division lines is not provided.

Accordingly, it would be advantageous to improve the user-friendliness in setting one or more division lines that intersect with one another at a predetermined angle in an image in response to an operation on a touch panel.

Aspects described herein may include various embodiments including an image dividing method, an image dividing apparatus, and a recording medium recording the image division program.

BRIEF DESCRIPTION OF THE DRAWINGS

FIG. 11 illustrates example user interface screens showing rotation of an image by 45 degrees according to one or more aspects described herein.

DETAILED DESCRIPTION

First Embodiment

A first embodiment will now be described with reference to FIGS. 1 to 4.

(1) General Configuration

Figure 1:
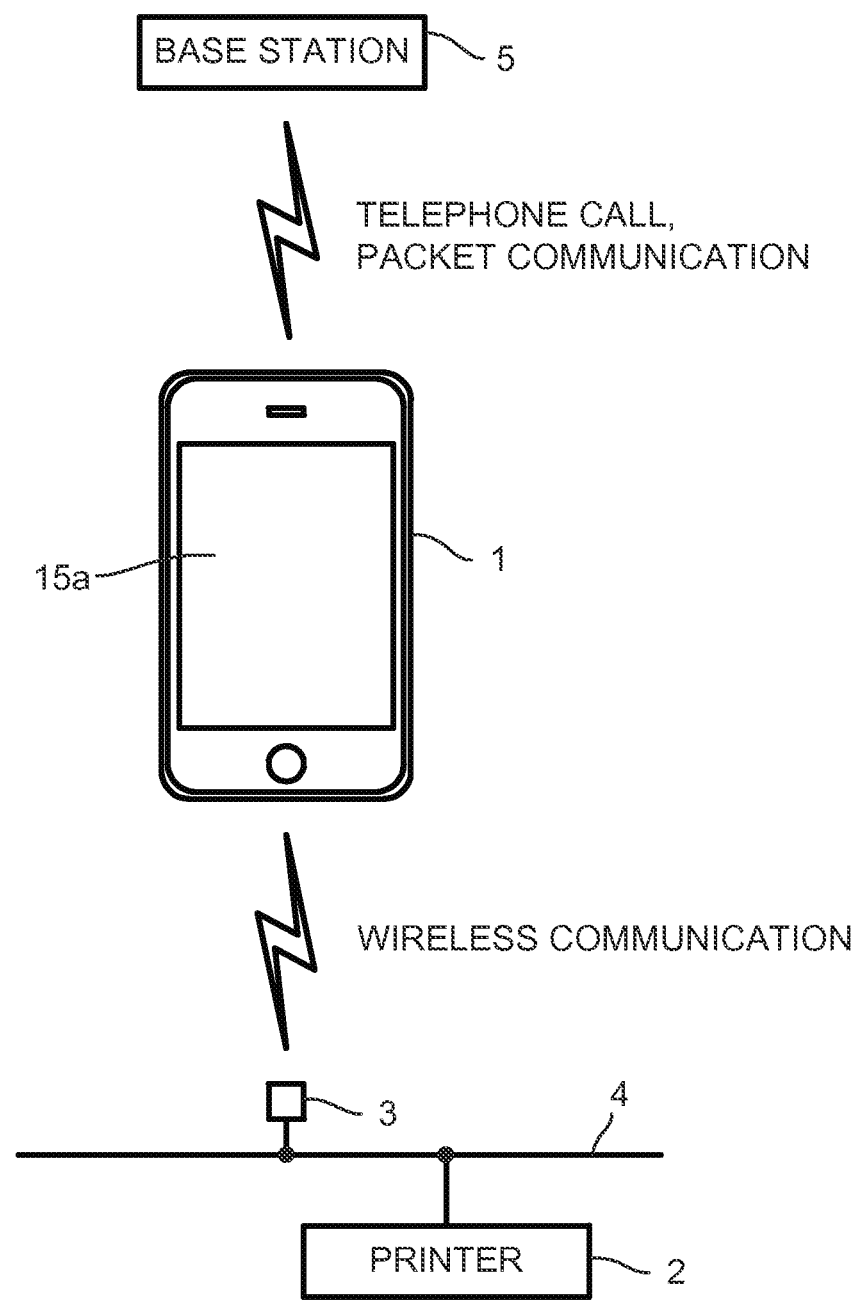
FIG. 1 is a schematic diagram illustrating an example mobile phone and an example printer according to a first embodiment described herein.

FIG. 1 is a schematic diagram illustrating a mobile phone 1 (an example of a display apparatus) and a printer 2 connected to the mobile phone 1 so as to be capable of communication with the mobile phone 1 according to the first embodiment of the present invention. The mobile phone 1 has a wireless communication function, in addition to a telephone call function, and is wirelessly connected to a communication network 4, such as a local area network (LAN) or the Internet, via a wireless LAN router 3 or the like. The mobile phone 1 instructs the printer 2 to perform printing over the communication network 4 to cause the printer 2 to print an image.

(2) Electrical Configuration of Mobile Phone

Figure 2:
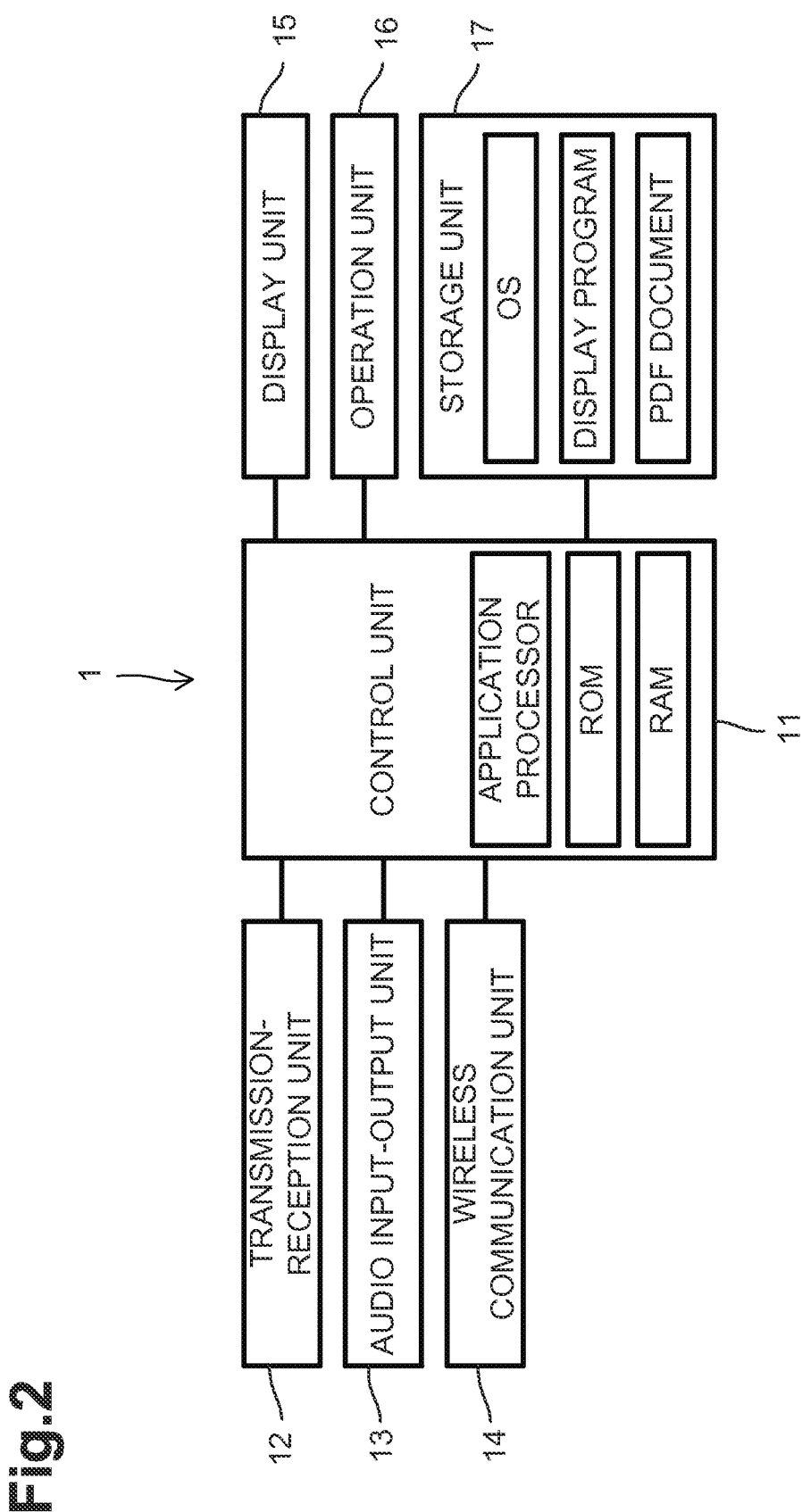
FIG. 2 is a block diagram illustrating an example electrical configuration of the mobile phone.

FIG. 2 is a block diagram illustrating an example electrical configuration of the mobile phone 1. The mobile phone 1 includes a control unit 11, a transmission-reception unit 12, an audio input-output unit 13, a wireless communication unit 14, a display unit 15, an operation unit 16, and a storage unit 17.

The control unit 11 includes, for example, an application processor, a read only memory (ROM), and a random access memory (RAM). The application processor executes various programs (e.g., computer readable instructions) stored in the ROM or the storage unit 17 to control each component in the mobile phone 1. The ROM stores various programs executed by the application processor, data, and so on. The RAM is used by the application processor as a main memory to execute a variety of processing.

The transmission-reception unit 12 includes, for example, an antenna, a radio-frequency (RF) circuit, and a baseband processor. The transmission-reception unit 12 transmits and receives audio signals to and from a base station 5 via the antenna. The transmission-reception unit 12 is capable of performing packet communication with the base station 5.

The audio input-output unit 13 includes, for example, a microphone, a speaker, and an audio processing circuit. An audio signal input with the microphone is transmitted to the base station 5 by the transmission-reception unit 12 and an audio signal received from the base station 5 by the transmission-reception unit 12 is output from the speaker.

The wireless communication unit 14 is configured according to Wireless Fidelity (Wi-Fi) (registered trademark) and is wirelessly connected to the communication network 4 via the wireless LAN router 3 or the like.

The standard of the wireless communication is not limited to Wi-Fi, and the wireless communication may conform to any standard, protocol and type of signal as long as the mobile phone 1 is capable of wirelessly connecting to the communication network 4 according to the standard. For example, the mobile phone 1 may be configured so as to achieve the wireless connection according to Bluetooth (registered trademark) or by optical wireless data communication, such as IrDA, by using infrared rays.

Although the case in which the mobile phone 1 is wirelessly connected to the communication network 4 is exemplified in the present embodiment, the mobile phone 1 may be connected by wire to the communication network 4.

Although the case in which the mobile phone 1 is connected to the printer 2 over the communication network 4 is exemplified in the present embodiment, the mobile phone 1 may be directly connected to the printer 2.

The display unit 15 includes, for example, a display device, such as a liquid crystal display or an organic electroluminescent (EL) display, and a drive circuit driving the display device. The display unit 15 is configured so as to be capable of displaying an image.

The operation unit 16 includes, for example, a substantially transparent touch panel provided over a display surface 15*a* of the display unit 15, a control circuit controlling the touch panel, and various operation buttons. A user operates the operation unit 16 to, for example, input a telephone number or operate an application program.

The storage unit 17 uses a non-volatile memory, such as a flash memory, to store various programs and data. An operating system (OS), application programs, the various programs for image data, etc., and data are stored in the storage unit 17. An image division program and a print program are stored as the application programs in the first embodiment.

(3) Image Division Process

The image division process may include dividing an image into multiple sub-images with division lines that are set in the image and that intersect with one another at a predetermined angle. In the process, the user may select any of the multiple sub-images resulting from the division. The selected sub-image may then be supplied to an external program or another program internal to the mobile phone 1. In a particular example, another program internal to the mobile phone 1 may include an image gallery application, a multimedia messaging application and the like.

In the first embodiment, the division lines are illustrated and described as intersecting with one another at 90 degrees. For example, the division lines are orthogonal to one another.

In the example of the first embodiment, the external program may include the print program. Alternatively or additionally, the external program may be a program by which a sub-image attached to an electric mail is transmitted, a program by which a sub-image is stored as other image data, or a program by which a sub-image is processed. The type of processing used for the selected sub-image may be appropriately selected. For example, the type of processing used for the selected sub-image may be selected prior to, during or after setting division lines and selecting the sub-image. In some examples, the type of processing may be selected within the image processing program (e.g., as a configuration setting). In other examples, the type of processing may be selected outside of the image processing program (e.g., after the sub-image has been selected and stored).

(3-1) Process for Setting Division Lines

Figure 3:
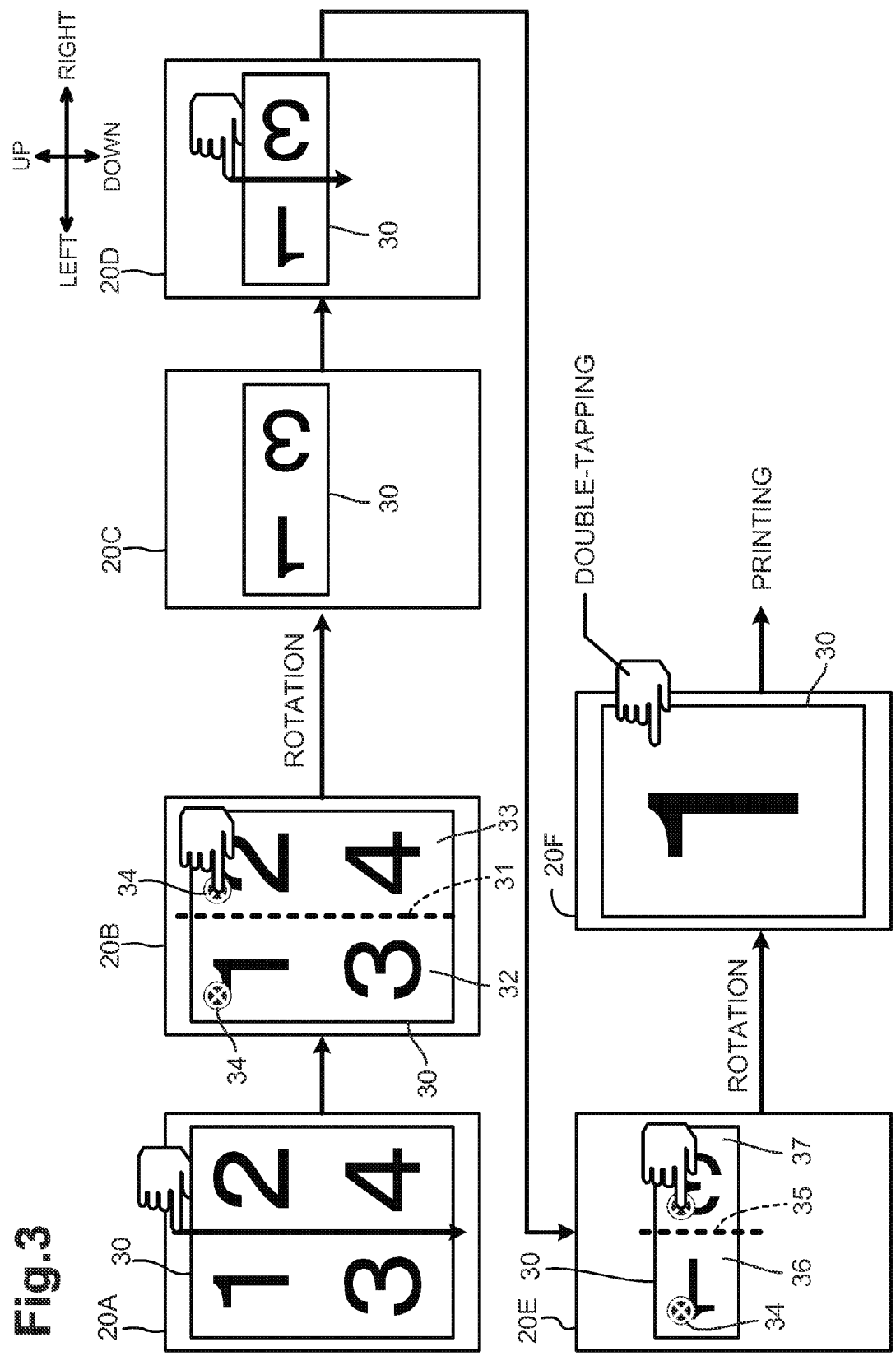
FIG. 3 is a schematic diagram illustrating a process flow of setting division lines according to the first embodiment.

FIG. 3 is a schematic diagram illustrating a process flow for setting division lines that are orthogonal to each other in an image according to the first embodiment. The schematic diagram in FIG. 3 illustrates variations in a screen 20 displayed in the display unit 15 over time.

1) As illustrated on a screen 20A, the user may perform a slide operation in which the user contacts a position above or in a top portion of an image 30 on a touch panel with his/her finger (an example of a contact object) and linearly moves his/her finger toward a position below or in a bottom portion of the image. The user may use a stylus pen (an example of the contact object), instead of or in addition to his/her finger, to perform the slide operation.

In some arrangements, only the slide operation in the substantially vertical direction might be accepted as a division line setting operation or input, and thus, a slide operation or input in a direction other than the substantially vertical direction is not accepted. For example, a substantially vertical direction may include a direction in which the direction along a movement path of the finger forms an acute angle within a predetermined angle range with the vertical direction (an example of a "direction that is set in advance as an extending direction of each division line"). In a particular example, the vertical direction may correspond to a direction that is orthogonal to horizontal or width-wise axis of the display screen of the device. In some configurations, the predetermined angle range may be 0-10 degrees.

2) In response to the slide operation in the substantially vertical direction by the user, as illustrated on a screen 20B, a straight line 31 along the movement path of the finger is displayed on the screen 20 as a division line. As a result, one division line is set in the image 30.

The straight line 31 along the movement path may be referred to as a straight line resulting from extension of the movement path that linearly extends. In one example, the division line 31 may correspond to a line along the vertical direction originating from the initial user touch or contact point or passing through a user touch or contact point. As such, if a user moves his or her finger or other contact device in a slightly non-vertical manner (e.g., angled or slanted), the division line 31 may be automatically corrected to follow or be parallel to the vertical direction. In another example, the straight line 31 may correspond to a line segment connecting a movement start point to a movement end point.

A Delete button 34 is displayed at an upper left position of each of sub-images 32 and 33 divided with the division line 31.

3) In response to pressing of the Delete button 34 on a sub-image (e.g., as an image that is not required or needed by the user), the sub-image is deleted from the image and, as illustrated on screen 20C, the image 30 resulting from the deletion of the sub-image is rotated about, for example, the centroid of the image 30 counterclockwise by 90 degrees. Ninety degrees is an example of a predetermined angle. Other angles of rotation may also be used as described in further detail herein. The center of the rotation may be any one point in the image 30.

If it is not possible to fit the entire image 30 on the screen 20 after the rotation, the size and the position of the image after the rotation may be changed in accordance with the screen size of the display unit 15 so that the entire image 30 after the rotation is displayed on the screen 20. In a particular example, the image 30 is enlarged or contracted to a maximum size within a size range in which the entire image 30 is fit into the display area of the screen 20. The position of the image 30 after the enlargement or the contraction is moved so that the entire image 30 is fit into the display area of the screen 20.

In one example, as illustrated on screen 20C, the rotation of the image 30 causes the Delete button 34 not to be displayed.

4) The user is capable of performing the slide operation even after the rotation of the image 30 to create further division lines. For example, in response to the slide operation by the user in a manner illustrated on a screen 20D, a division line 35 is displayed in a manner illustrated on a screen 20E and the Delete button 34 is displayed at an upper left position of each of sub-images 36 and 37.

Since the image is rotated by 90 degrees since the previous division line 31 has been set, the division line 35 that is newly set is orthogonal to the previous division line 31.

5) In response to pressing of the Delete button 34 on a sub-image that is not required by the user, the sub-image is deleted from the image 30. As illustrated on screen 20F, the image 30 resulting from the deletion of the sub-image is rotated clockwise by 90 degrees and the Delete button 34 is caused not to be displayed.

6) Double-tapping on the remaining image 30 in a manner illustrated on screen 20F causes the remaining image to be supplied to the print program. The "double-tapping" may include an operation in which the user touches the touch panel with his/her finger (or another contact device) consecutively twice within a short time period (e.g., 1 second, 2 seconds, 0.5 seconds, etc.).

The double-tapping may be performed at an any stage. For example, the image 30 illustrated on screen 20B is output when the double-tapping is performed on the screen 20B, and the image 30 illustrated on screen 20D is output when the double-tapping is performed on screen 20D.

(3-2) Cancellation of Division Line

After a division line is set, the user may cancel the setting of the division line by single-tapping on a part of the user interface or image other than the Delete button 34 in the sub-image. The "single-tapping" may include an operation in which the user touches the touch panel with his/her finger (or another contact device) once.

In response to the single-tapping on a part other than the Delete button 34 by the user when a division line is set, the set division line is canceled and the image 30 is rotated in a direction opposite to that of the previous rotation (e.g., an immediately previous rotation) by 90 degrees to return the image 30 to the state before the previous rotation.

(3-3) Setting of Multiple Parallel Division Lines

After setting a division line by the slide operation, the user may set multiple division lines that are parallel to one another by performing the slide operation again before the user performs another type of operation (the single-tapping, the double-tapping, or the pressing of the Delete button 34).

(3-4) Image Division Process Flow

Figure 4:
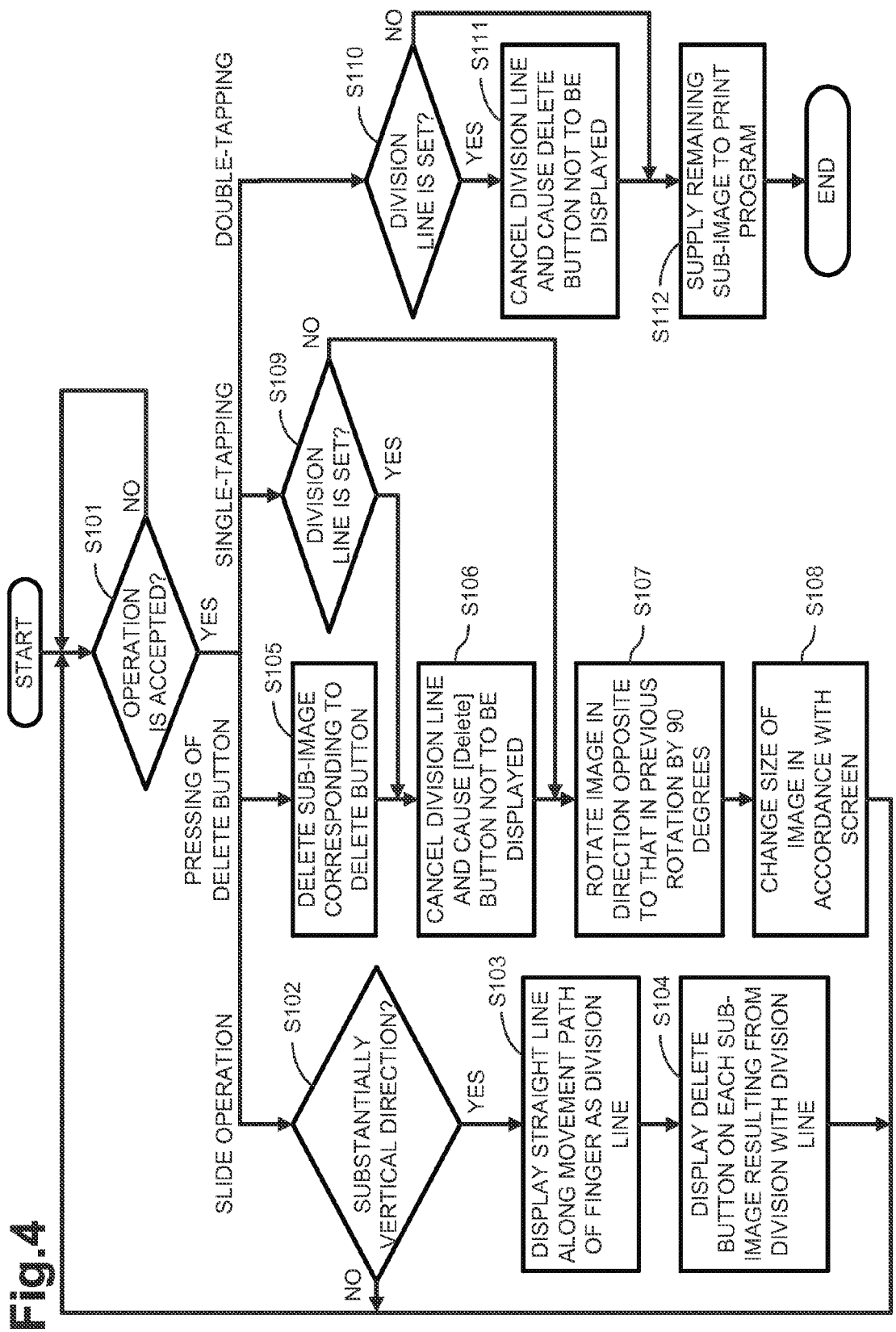
FIG. 4 is a flowchart illustrating an exemplary image division process according to the first embodiment.

FIG. 4 is a flowchart illustrating an exemplary image division process according to the first embodiment. In response to selection of an image for an image division process and a user instruction to initiate the image division process, an image division program is invoked from the print program and the image selected by the user is passed to the image division program. The image division program displays the image passed from the print program on the screen 20 of the display unit 15 (an example of a displaying step). The process in FIG. 4 is then started upon display of the image on the screen 20 in the displaying step.

Referring to FIG. 4, in Step S101, the control unit 11 executing the image division program or process (hereinafter referred to as the "image division program") waits for acceptance of any of the operations: the slide operation, the pressing of the Delete button 34, the single-tapping, and the double-tapping.

The pressing of the Delete button 34 is enabled only after the Delete button 34 is displayed in each sub-image in Step S104 described below and is disabled at a stage immediately after the image division program is activated.

Upon acceptance of any of the above operations, the process goes to Step S102 if the accepted operation is the slide operation, to Step S105 if the accepted operation is the pressing of the Delete button 34, to Step S109 if the accepted operation is the single-tapping, and to Step S110 if the accepted operation is the double-tapping.

Step S102 is executed when the slide operation is accepted in Step S101. In Step S102, the image division program determines whether the accepted slide operation is a slide operation in the substantially vertical direction. If the accepted slide operation is the slide operation in the substantially vertical direction, the process goes to Step S103. If the accepted slide operation is in a direction other than the substantially vertical direction, the process goes back to Step S101 to wait for acceptance of the next operation.

In Step S103, the image division program displays a straight line along the movement path of a finger in the image as a division line (an example of a setting step).

In Step S104, the image division program displays the Delete button 34 at an upper left position of each sub-image resulting from the division with the division line. After displaying the Delete button 34, the process goes back to Step S101 to wait for acceptance of the next operation.

Step S105 is executed when the pressing of the Delete button 34 is accepted in Step S101. In Step S105, the image division program deletes the sub-image corresponding to the Delete button 34 that is pressed from the image (an example of a deleting step).

In Step S106, the image division program cancels the set division line and causes the Delete button to not be displayed (e.g., removed the Delete button from the screen).

Step S106 is also executed if the single-tapping is accepted and the image division program determines that a division line is set in Step S109 described below. Execution of step S106 when the image division program determines in Step S109 that a division line is set is an example of a canceling step.

In Step S107, the image division program rotates the image resulting from the deletion of the sub-image by 90 degrees (example of a rotating step).

The image is rotated in a direction opposite to a direction of a previous rotation of the image occurring after a previous instance of Step S106 is executed. For example, if the image was previously rotated counterclockwise by 90 degrees in a previous instance of S107, the image is rotated clockwise by 90 degrees in the current instance of step S107.

In Step S108, the image division program changes the size of the image after the rotation in accordance with the size of the screen (an example of a size changing step). The position of the image is moved so that the image is fit into the screen 20. After the change of the size of the image, the process goes back to Step S101 to wait for acceptance of the next operation.

Step S107 and Step S108 are also executed when the single-tapping is accepted. Since the single-tapping is accepted even in a state in which the image has not been rotated, Step S107 and Step S108 are not executed if the single-tapping is performed in the state in which the image has not been rotated.

Step S109 is executed when the single-tapping is accepted in Step S101. In Step S109, the image division program determines whether a division line is set. If a division line is set, the process goes to Step S106. If a division line is not set, the process goes to Step S107.

Step 110 is executed when the double-tapping is accepted in Step S101. In Step S110, the image division program determines whether a division line is set. If a division line is set, the process goes to Step S111. If a division line is not set, the process goes to Step S112.

In Step S111, the image division program cancels the set division line and causes the Delete button not to be displayed.

In Step S112, the image division program supplies the remaining sub-image to the print program.

(4) Advantages of First Embodiment

With the image division process or program according to the first embodiment described above, a user may set both division lines that vertically extend in an image and that horizontally extend therein. For example, the image may be rotated by 90 degrees after the user vertically moves his/her finger to set the vertically extending division line. After rotating the image by 90 degrees, the user may then set a further division line that extends horizontally by moving his/her finger or another contact device in a vertical direction when the image is in the 90 degree rotated position.

As such, the user may move his/her finger in the same direction to set the division lines that are orthogonal to one another. Accordingly, it is not necessary for the user to move his/her finger in different directions for different division lines, thus facilitating the operation of setting division lines.

Consequently, with the image division program, it is possible to improve the user-friendliness in the setting of division lines that are orthogonal to one another in the image in response to an operation on the touch panel.

In addition, with the image division program, since a sub-image that is selected is deleted from the image, the deletion of sub-images that are not required or not desired allows the user to obtain only the sub-images that are required.

Furthermore, with the image division program, in response to the pressing of the Delete button 34 by the user to select a sub-image to be deleted, the selected sub-image is deleted and the image resulting from the deletion of the sub-image is rotated. Accordingly, it is possible to reduce the number of user operations, compared to a case in which the operation to select a sub-image to be deleted is performed by a user independently of the operation to rotate the image.

Furthermore, with the image division program, the user can perform the single-tapping to cancel a division line that is set.

With the image division program, since the image is rotated by 90 degrees after the single-tapping, the direction in which the user moves his/her finger in resetting of a division line is the same as the direction in which the user moves his/her finger in the setting of the previous division line. Accordingly, it is possible to facilitate the setting of division lines in the same or in different directions.

With the image division program, since the direction of rotation of the image is opposite to that of the previous rotation of the image, it is possible to return the image to the state before the image is previously rotated.

Furthermore, with the image division program, since the size of the image after the rotation is changed in accordance with the display area of the touch panel, it is possible to display the entire image after the rotation on the screen even if it is not possible to fit the entire image into the screen of the display unit 15 when the image after the rotation is displayed without modification.

Furthermore, with the image division program, since the direction in which the image is divided is fixed to the substantially vertical direction, it is sufficient for the user to constantly move his/her finger in the same direction. Accordingly, it is possible to further improve the user-friendliness in the setting of the division lines that are orthogonal to one another in the image.

Furthermore, with the image division program, since the image is rotated in a direction opposite to the direction of the previous rotation of the image, the image is prevented from being set upside down.

Furthermore, with the image division program, the user can perform the slide operation again after a division line is set and before another operation (the single-tapping, the double-tapping, or the pressing of the Delete button 34). A user may thus continuously set multiple division lines that are parallel to one another. For example, the user can vertically set two division lines that are parallel to each other to divide the image into three sub-images and can delete a central sub-image, among the three sub-images, in the above manner.

Second Embodiment

A second embodiment will now be described with reference to FIGS. 5 and 6.

The "cancellation of the division line" and the "rotation of the image" functions may be allocated to the single-tapping in the first embodiment while the "cancellation of the division line" function is not allocated to the single-tapping and only the "rotation of the image" function is allocated to the single-tapping in the second embodiment. In the second embodiment, the user can perform the single-tapping at an arbitrary stage to rotate the image by 90 degrees without canceling a division line that is set.

Figure 5:
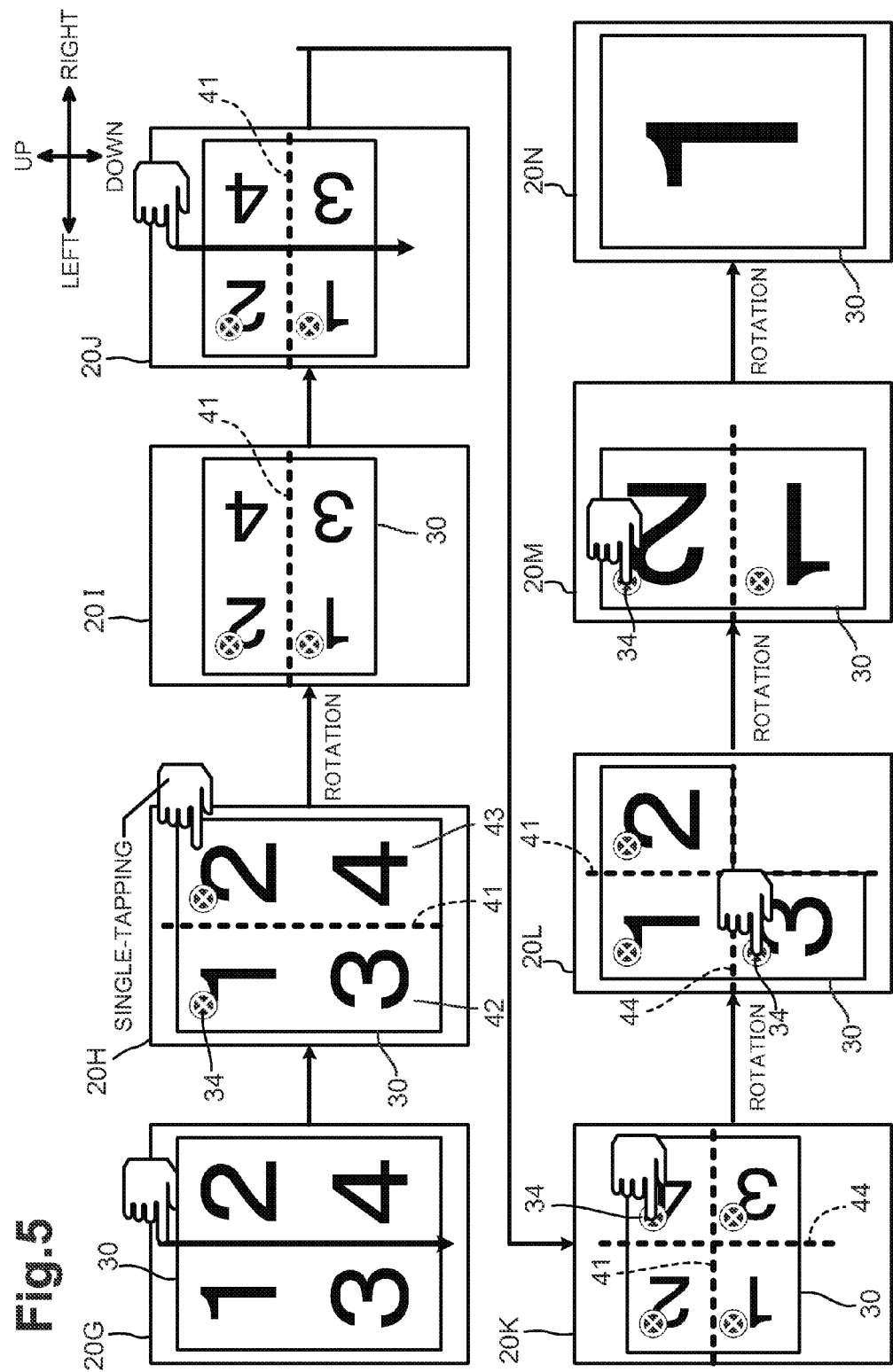
FIG. 5 is a schematic diagram illustrating a process flow for setting division lines according to a second embodiment.

FIG. 5 is a schematic diagram illustrating an example process flow for setting division lines according to the second embodiment.

1) As illustrated on screen 20G, the user performs the slide operation in which the user contacts a position above or in an top portion of an image on a touch panel with his/her finger or another contact device and linearly moves his/her finger toward a position below or in a bottom portion of the image.

2) In response to the slide operation in the substantially vertical direction by the user, as illustrated on screen 20H, a straight line 41 along the movement path of the finger is displayed as a division line in the image 30 and the Delete button 34 is displayed at an upper left position of each of sub-images 42 and 43 divided with the division line 41.

3) In response to the single-tapping on a portion other than the Delete button 34 in the image by the user, as illustrated on a screen 20I, the image 30 is rotated counterclockwise by 90 degrees.

4) The user can perform the slide operation also after the image 30 is rotated. For example, in response to the slide operation in a manner illustrated on a screen 20J by the user, a division line 44 is displayed in a manner illustrated on a screen 20K and the Delete button 34 is displayed at an upper left position of each sub-image.

5) In response to the pressing of the Delete button 34 by the user in a manner illustrated on the screen 20K, the corresponding sub-image is deleted and the image 30 resulting from the deletion of the corresponding sub-image is rotated clockwise by 90 degrees, as illustrated on a screen 20L.

6) In response to the pressing of the Delete button 34 by the user in a manner illustrated on screen 20L, the corresponding sub-image is deleted and the image 30 resulting from the deletion of the corresponding sub-image is rotated counterclockwise by 90 degrees.

7) In response to the pressing of the Delete button 34 in the sub-image by the user in a manner illustrated on screen 20M, the corresponding sub-image is deleted and the image 30 resulting from the deletion of the corresponding sub-image is rotated clockwise by 90 degrees.

Figure 6:
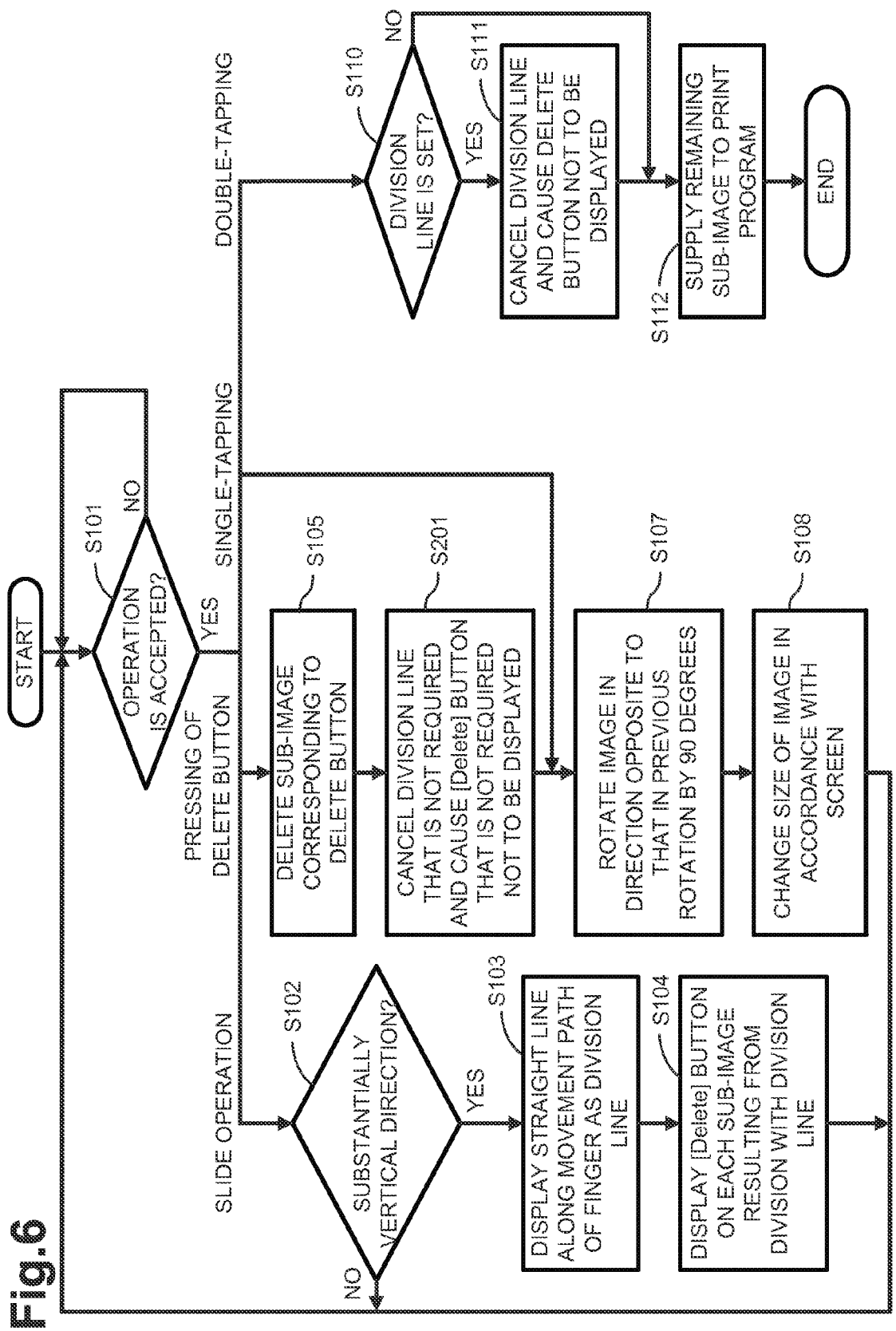
FIG. 6 is a flowchart illustrating an exemplary image division process according to the second embodiment.

FIG. 6 is a flowchart illustrating an exemplary process for image division according to the second embodiment. The same step numbers are used in the second embodiment to identify substantially the same steps as in the first embodiment. A description of such steps is omitted herein.

Referring to FIG. 6, in Step S201, the image division program cancels a division line that is not required and causes the Delete button 34 that is no longer required (e.g., due to the cancellation of the division line) to no longer be displayed. For example, when the sub-image indicating "3" is deleted in the manner illustrated on screen 20L, the horizontally extending division line and the Delete button 34 are deleted because they are no longer required.

However, when only one sub-image remains as the result of the deletion of the sub-images, the Delete button 34 displayed on the remaining sub-image may also be removed.

If the single-tapping operation/input is accepted in Step S101, the process goes to Step S107, instead of Step S106, as was the case in the first embodiment. Accordingly, upon acceptance of the single-tapping operation or input, the image is rotated by 90 degrees without canceling the division line that is set.

With the image division program according to the second embodiment described above, the user can perform the rotation operation to rotate the image without deleting the sub-images. For example, the user may want to delete the sub-images after all the division lines that are required are set, instead of rotating the image after the sub-images are deleted. Since the image can be rotated without deleting the sub-images with the image division program of the second embodiment, it is possible to improve the convenience for the user who wants to delete the sub-images after all the division lines that are required are set.

Third Embodiment

A third embodiment will now be described with reference to FIGS. 7 and 8.

In the third embodiment, the image is rotated by 90 degrees each time the division line is set. However, the image is not rotated in response to the pressing of the Delete button 34 in the third embodiment.

Figure 7:
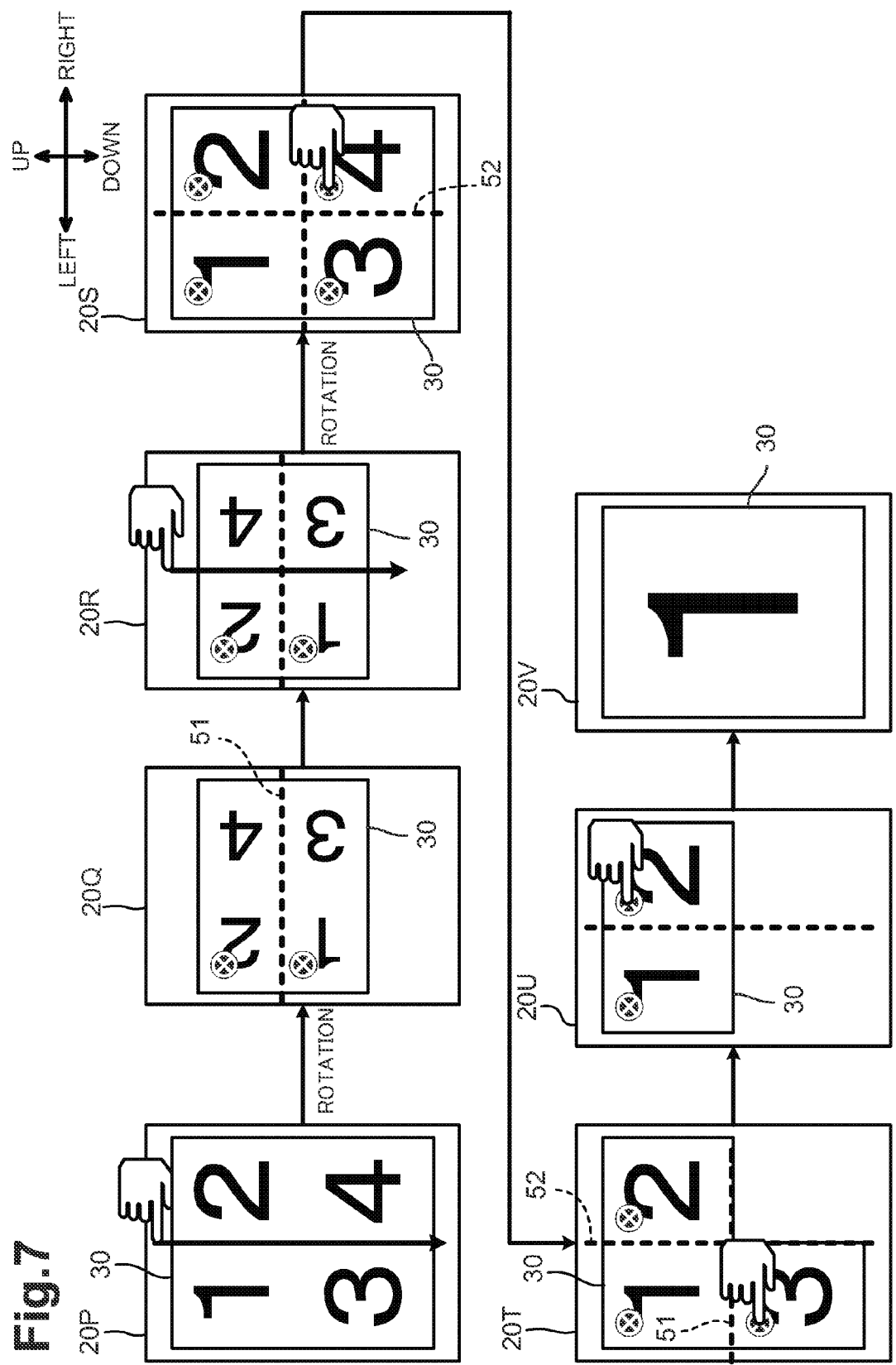
FIG. 7 is a schematic diagram illustrating a process flow for setting division lines according to a third embodiment.

FIG. 7 is a schematic diagram conceptually illustrating a basic flow of a process of setting division lines according to the third embodiment. As illustrated on screen 20P, in response to the slide operation in the substantially vertical direction by the user, a straight line 51 (refer to a screen 20Q) along the movement path of the finger is displayed as a division line in the image 30 and the Delete button 34 is displayed at an upper left position of each sub-image resulting from the division with the division line 51. Then, as illustrated on screen 20Q, the image is rotated counterclockwise by 90 degrees.

Similarly, as illustrated on screen 20R, in response to the slide operation in the substantially vertical direction by the user, a straight line 52 (refer to a screen 20S) along the movement path of the finger is displayed as a division line in the image 30 and the Delete button 34 is displayed at an upper left position of each sub-image resulting from the division with the division line 52. Then, as illustrated on the screen 20S, the image is rotated clockwise by 90 degrees.

In response to the pressing of the Delete button 34 on a sub-image that is not required by the user, as illustrated on screen 20T, the sub-image is deleted from the image 30. However, the resulting image 30 might not be rotated. As illustrated on screen 20U and screen 20V, in response to the subsequent pressing of the Delete button 34 on sub-images that are not required or desired by the user, the sub-images are deleted from the image 30 without rotating the image 30.

Figure 8:
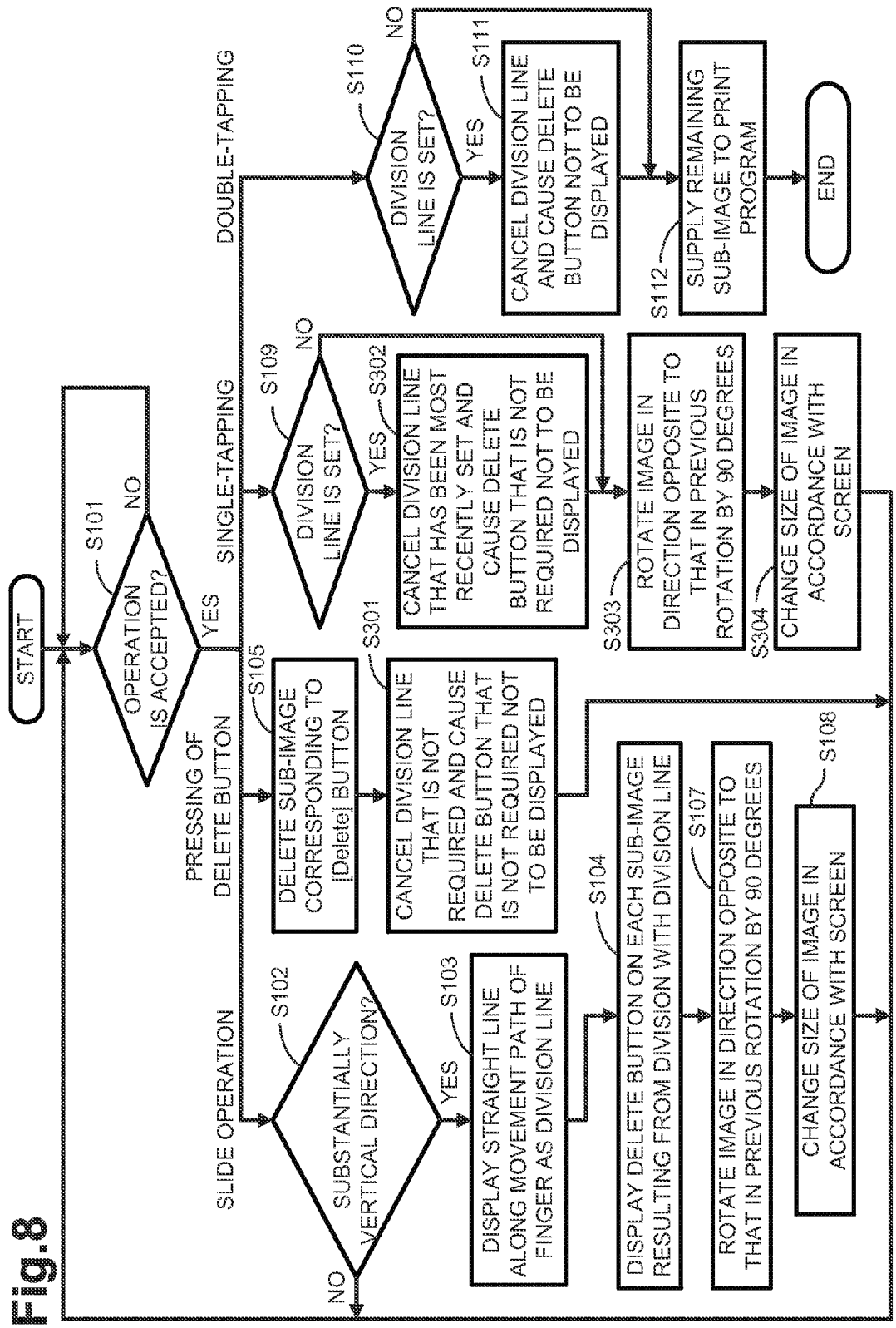
FIG. 8 is a flowchart illustrating an exemplary image division process according to the third embodiment.

FIG. 8 is a flowchart illustrating an exemplary process for image division according to the third embodiment. The same step numbers are used in the third embodiment to identify substantially the same steps as in the first embodiment. A description of such steps is omitted herein.

Steps S107 and S108 are executed after Step S104 in the flowchart according to the third embodiment. As a result, the image is rotated by 90 degrees in response to the setting of a division line but the image is not rotated in response to the deletion of a sub-image.

Referring to FIG. 8, in Step S301, the image division program cancels a division line that is not required and causes the Delete button 34 that is not required not to be displayed. For example, as illustrated on screen 20T, when the sub-image indicating "3" is deleted, horizontally extending division line 51 is deleted because it is not required and the Delete button 34 displayed on the sub-image indicating "3" is removed or otherwise caused to not be displayed because it is also not required.

In Step S302, the image division program cancels the division line that has been most recently set and causes the [Delete] button 34 that is not required not to be displayed. For example, in response to the single-tapping on the screen 20Q, the division line 51 that was set on the screen 20P is canceled.

In Step S303, the image division program rotates the image in a direction opposite to the direction of the previous rotation by 90 degrees.

In Step S304, the image division program changes the size of the image after the rotation in accordance with the size of the screen.

According to one or more arrangements, the third embodiment may be substantially equivalent to the first embodiment in the other aspects.

With the image division program and process according to the third embodiment described above, since an image is rotated by 90 degrees each time a division line is set, it is possible to reduce the number user interactions or operations, compared with a case in which the operation to set the division line is performed independently of the operation to rotate the image.

Fourth Embodiment

A fourth embodiment will now be described with reference to FIGS. 9 and 10.

In the fourth embodiment, when a new division line that is parallel to a previously set division line is set, the image is not rotated in response to the deletion of a sub-image if the number of the remaining sub-images has not decreased to one and the image is rotated only when the number of the remaining sub-images has decreased to one.

Figure 9:
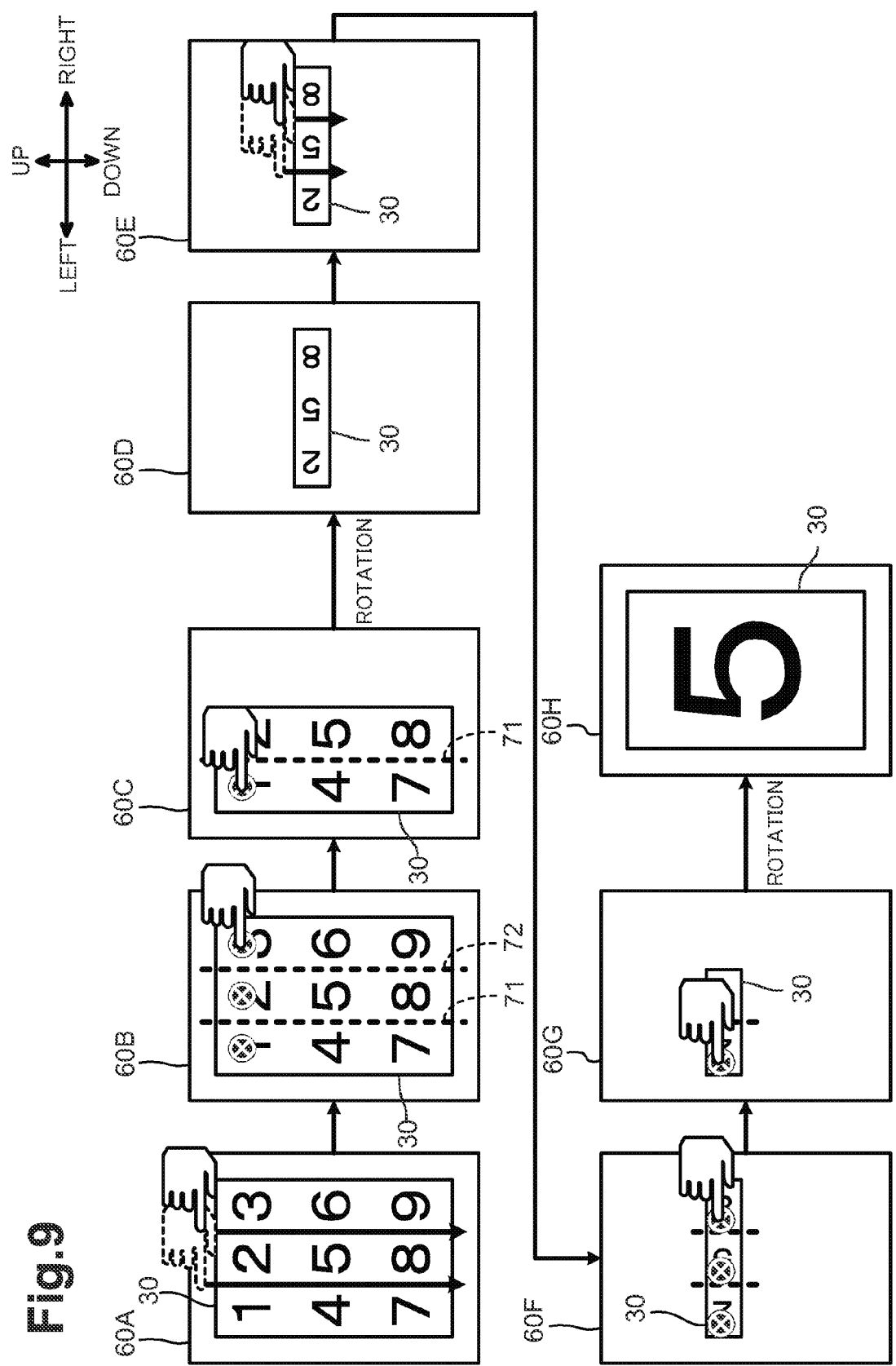
FIG. 9 is a schematic diagram illustrating a process flow for setting division lines according to a fourth embodiment.

FIG. 9 is a schematic diagram illustrating a process flow for setting division lines according to the fourth embodiment. In the fourth embodiment, for example, even when a right sub-image, among three sub-images, is deleted on a screen 60B, the remaining image 30 might not rotated, as illustrated on a screen 60C. The remaining image 30 might not be rotated because the remaining image 30 includes two sub-images. In response to the deletion of a left sub-image on the screen 60C, the remaining image 30 is rotated counterclockwise by 90 degrees, as illustrated on a screen 60D, because the number of the remaining sub-images decreases to one (e.g., is now equal to one).

Screens 60E, 60F and 60G illustrate a further division line setting process. In these screens, the division line setting process occurs after the rotation in the counterclockwise direction. Once the remaining number of images is equal to one, the remaining image may be rotated in a direction opposite to the immediately previous direction of rotation. Accordingly, the image 30 may be rotated in a clockwise direction between screens 60G and 60H. Screen 60H illustrates the resulting selected image.

Figure 10:
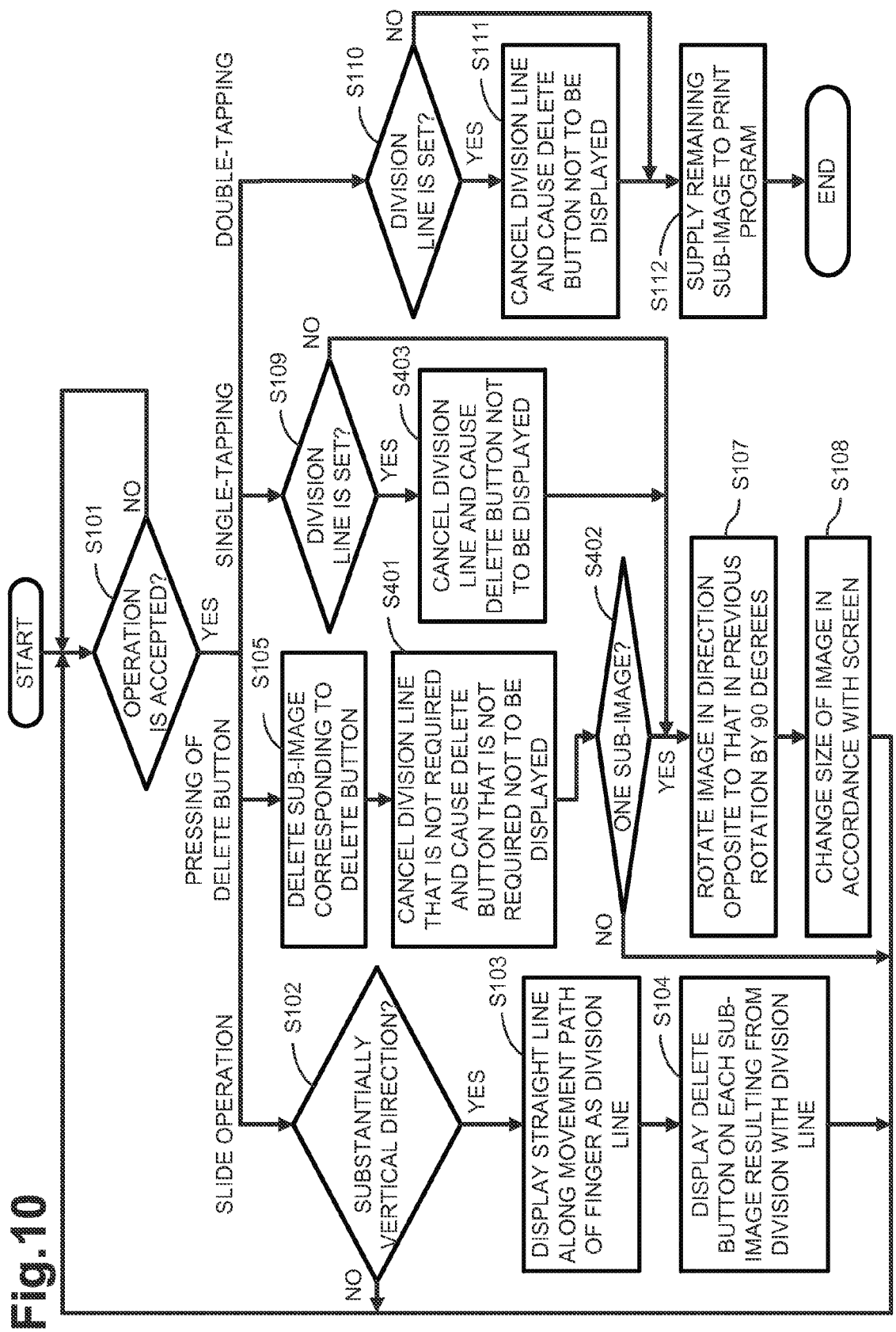
FIG. 10 is a flowchart illustrating an exemplary image division process according to the fourth embodiment.

FIG. 10 is a flowchart illustrating an exemplary process of an image division program according to the fourth embodiment. The same step numbers are used in the fourth embodiment to identify substantially the same steps as in the first embodiment. A description of such steps is omitted herein.

Referring to FIG. 10, in Step S401, the image division program or process cancels a division line that is not required and causes the Delete button 34 that is not required not to be displayed.

For example, in response to the deletion of the right sub-image on the screen 60B, a division line 72 that separates the right sub-image from the central sub-image on the screen 60B is canceled because it is not required and the Delete button 34 displayed on the right sub-image is removed or otherwise caused to not be displayed.

In Step S402, the image division program determines whether the number of the remaining sub-images has been decreased to one (e.g., equals one). If the number of the remaining sub-images has decreased to one, the process goes to Step S107. If the number of the remaining sub-images is two or more (e.g., more than one), the process goes back to Step S101 to wait for acceptance of the next operation.

In Step S403, the image division program cancels the division line that is set and causes the Delete button 34, that is not required as the result of the cancellation of the division line, to not be displayed. Then, the process goes to Step S107.

The fourth embodiment is substantially equivalent to the first embodiment in the other points.

With the image division program according to the fourth embodiment described above, when multiple division lines that are parallel to one another are set to divide the image into three or more sub-images, the image is not rotated in response to the deletion of a sub-image before the number of the remaining sub-images decreases to one. Accordingly, it is possible to prevent the image from being unnecessarily rotated, allowing the user to efficiently obtain the sub-images that are required.

As described herein, a rotation condition may be used to determine whether an image is to be rotated. The rotation condition may include one or more requirements, user actions, conditions, parameters and the like for rotating the image and may include selection or performance of at least one non-rotation operation. According to some arrangements, a user command or input directed solely to rotation (e.g., a single-tap input as described with respect to FIG. 6) might not satisfy the rotation condition. Instead, the rotation condition may, in some examples, require a non-rotation operation. In one example, the rotation condition may include whether a division line was set or was appropriately set, wherein the setting of the division line may correspond to the non-rotation operation. In yet another example, the rotation condition may include the selection of a delete operation, a number of remaining sub-images being equal to a predefined number (e.g., S402 in FIG. 10), performance of a division line setting operation and the like and/or combinations thereof. Any of the various parameters, processes, user inputs, user commands, decision processes, conditions and the like described herein may correspond to a rotation condition.

Other Embodiments

Aspects of the present disclosure are not limited to the embodiments described above with reference to the drawings. For example, the following embodiments are also included in the technical scope of the present invention.

(1) While intersecting division lines are described herein as intersecting at right angles, the division lines may intersect at other angles such as 45 degrees. In this case, it is possible for the user to set the division lines that intersect with each other at 45 degrees by vertically sliding his/her finger to set the first division line and vertically sliding his/her finger again after the image is rotated by 45 degrees. In other words, also in the setting of the division lines that intersect with one another at 45 degrees, the direction of the movement of the finger is the same as that in the setting of the division lines that intersect with one another at a right angle. Forty-five degrees is an example of the predetermined angle.

FIG. 11 illustrates an example division line setting and image processing process in which the rotation angle is 45 degrees. In particular, in screens 20A and 20B, the user may set a division line 31 in a vertical direction (similar to what is shown in FIG. 3). Once the user selects sub-image 33 to be deleted, the remaining image 32 may be rotated by 45 degrees, resulting in screen 20C. The user may then define a subsequent division line 35 as shown in screen 20D. After selection of sub-image 37 for deletion, the remaining image 36 may be rotated in a direction opposite to the direction of the preceding rotation and by the same rotation amount. Accordingly, the image may result in the image as shown in screen 20F.

The user may specify whether the division lines that intersect with one another at 45 degrees are set or the division lines that intersect with one another at a right angle are set, and the angle specified by the user may be used as the predetermined angle to rotate the image.

(2) While aspects described herein relate to deletion of sub-images that are not required or desired from the image and supplying of the remaining sub-image to a print program, the sub-images that are not required or desired might not be deleted. For example, on screen 20S in FIG. 7, only the sub-image subjected to the double-tapping by the user, among the multiple sub-images resulting from the division, may be copied to be supplied to the print program. However, the sub-image might not be deleted from the image 30 and may be retained instead.

(3) While aspects described herein relate to a process in which the image is rotated in a direction opposite to the direction of the previous rotation of the image, the image may be repeatedly rotated in the same direction rather than an opposite direction in other arrangements.

(4) While aspects described herein relate to processes in which only a slide operation in a substantially vertical direction is accepted, processes in which only a slide operation in a substantially horizontal direction may be accepted or only the slide operation in an oblique direction may be accepted may also be used.

Alternatively, the slide operation in any direction may be accepted. Although it is possible to set the division lines that are orthogonal to one another only by the slide operation in one direction with the image division program, the acceptance of the slide operation in any direction may be convenient for some users.

(5) Although the case in which the division lines that are parallel to one another can be continuously set is described in the above first to third embodiments, the division lines that are parallel to one another might not be allowed to be consecutively set. For example, in response to the acceptance of the slide operation by the user, the next slide operation might not be accepted before one or more of the single-tapping, the double-tapping, and the pressing of the Delete button is accepted. Accordingly, an operation other than a slide operation may be required before a next slide operation is accepted or recognized by the device.

(6) Although the display apparatus is exemplified by the mobile phone in the above embodiments, the present invention may be applied to a tablet computer or a portable information terminal provided with a touch panel or any other computing device having a directional input device.

Alternatively, aspects described herein may be applied to a printer provided with a display unit in which an image is capable of being displayed and a touch panel. For example, a direct print function is common in printers, in which a digital image stored in a removable memory may be is loaded is printed. Aspects described herein may be applied to a case in which a digital image that is stored is displayed in the display unit, the displayed digital image is divided with division lines, and a sub-image selected by the user, among the multiple sub-images resulting from the division, is printed with this direct print function.

(7) Although the case in which the setting step and the rotating step are performed by the control unit 11 is described in the above embodiments, these processes may be performed by different central processing units (CPUs), Application Specific Integrated Circuits (ASICs), or other circuits.

What is claimed is:

1. A non-transitory computer readable medium storing computer readable instructions that, when executed, cause an apparatus to:
  display an image on a display unit;
  receive first user input for setting of a division line in the image, wherein the first user input includes a first movement path;
  determine whether a direction of the first movement path is within a predefined range of a specified direction;
  in response to determining that the direction of the first movement path is within the predefined range of the specified direction, set a first division line in the image along the first movement path of the user input thereby defining a plurality of sub-images;
  determine whether a rotation condition is satisfied, wherein satisfaction of the rotation condition requires selection of at least one non-rotation operation; and
  in response to determining that the rotation condition is satisfied, rotate at least one of the plurality of sub-images by a predetermined angle after the division line is set,
  wherein the at least one of the plurality of sub-images is displayed on the display unit, and
  wherein, when the rotated at least one of the plurality of sub-images includes at least two of the plurality of sub-images, the apparatus is caused to maintain a relative alignment and a relative orientation, defined according to the image as displayed prior to receiving the first user input, between the at least two of the plurality of sub-images.

2. The computer readable medium according to claim 1, wherein the predetermined angle is 90 degrees.

3. The computer readable medium according to claim 1, wherein the computer readable instructions, when executed, further cause the apparatus to:
  delete, upon receiving a selection operation, in which one of the plurality of sub-images divided with the first division line is selected, the selected one of the plurality of sub-images from the image, wherein the non-rotation operation includes the selection operation.

4. The computer readable medium according to claim 3, wherein, in response to the deletion of the selected one of the plurality of sub-images, a remaining sub-image is rotated by the predetermined angle.

5. The computer readable medium according to claim 3, wherein the computer readable instructions, when executed, further cause the apparatus to:
  receive second user input for setting of a division line in the image, wherein the second user input includes a second movement path; and
  set a second division line that is parallel to the first division line if the first and second user inputs are received without receiving another user operation therebetween.

6. The computer readable medium according to claim 5, wherein determining whether a rotation condition is satisfied includes determining whether a number of remaining sub images is equal to 1.

7. The computer readable medium according to claim 1, wherein the at least one of the plurality of sub-images is rotated by the predetermined angle each time a division line is set, wherein the non-rotation operation includes setting of a division line.

8. The computer readable medium according to claim 1, wherein the computer readable instructions, when executed, further cause the apparatus to:
  receive user input corresponding to a cancellation operation for cancelling the first division line, wherein the cancellation operation user input is received after a first rotation of the at least one of the plurality of sub-images; and
  in response to the cancellation operation user input and without requiring any other user input, cancel the first division line and perform a second rotation of the at least one of the plurality of sub-images in a direction opposite to that of the first rotation of the at least one of the plurality of sub-images by the predetermined angle.

9. The computer readable medium according to claim 1, wherein the computer readable instructions, when executed, further cause the apparatus to:
  change, after rotation of the at least one of the plurality of sub-images, a size of the at least one of the plurality of sub-images in accordance with a size of a display area.

10. The computer readable medium according to claim 1, wherein a division line is only set when the movement path is within a predetermined range of the specified direction.

11. An apparatus comprising:
  a display configured to display an image; and
  a processor, wherein the processor, upon executing one or more computer readable instructions, causes the apparatus to perform:
    displaying the image on the display;
    receiving first user input for setting of a division line in the image, wherein the first user input includes a first movement path;
    determining whether a direction of the first movement path is within a predefined range of a specified direction;
    in response to determining that the direction of the first movement path is within the predefined range of the specified direction, setting a first division line in the image along the first movement path of the user input thereby defining a plurality of sub-images;
    determining whether a rotation condition is satisfied, wherein satisfaction of the rotation condition requires selection of at least one non-rotation operation; and in response to determining that the rotation condition is satisfied, rotating at least one of the plurality of sub-images by a predetermined angle after the division line is set, wherein the at least one of the plurality of sub-images is displayed on the display, and wherein, when the rotated at least one of the plurality of sub-images includes at least two of the plurality of sub-images, the apparatus is caused to maintain a relative alignment and a relative orientation, defined according to the image as displayed prior to receiving the first user input, between the at least two of the plurality of sub-images.

12. A method comprising:

displaying, by an image processing device, the image;

receiving, by the image processing device, first user input for setting of a division line in the image, wherein the first user input includes a first movement path;

determining, by the image processing device, whether a direction of the movement path is within a predefined range of a specified direction;

in response to determining that the direction of the movement path is within the predefined range of the specified direction, setting, by the image processing device, a division line in the image along the movement path of the user input thereby defining a plurality of sub-images;

determining, by the image processing device, whether a rotation condition is satisfied, wherein satisfaction of the rotation condition requires selection of at least one non-rotation operation; and in response to determining that the rotation condition is satisfied, rotating, by the image processing device, at least two of the plurality of images by a predetermined angle after the division line is set, wherein the image processing device maintains a relative alignment and a relative orientation, as defined according to the image as displayed prior to receiving the first user input, between the at least two of the plurality of sub-images when the at least two of the plurality of images are rotated.

13. A non-transitory computer readable medium storing computer readable instructions that, when executed, cause an apparatus to perform:

a displaying step of displaying an image;

a receiving step of receiving user input for setting of a division line in the image, wherein the user input includes a movement path;

a first determining step of determining whether a direction of the movement path is within a predefined range of a specified direction;

a setting step of setting a division line in the image along the movement path of the user input, thereby defining a plurality of sub-images, in response to determining that the direction of the movement path is within the predefined range of the specified direction in the first determining step;

a deleting step of deleting, upon receiving a selection of one of the plurality of sub-images divided with the division line, the selected one of the plurality of sub-images from the image;

a second determining step of determining, after the selected one of the plurality of sub-images is deleted in the deleting step, whether a number of remaining sub-images displayed is equal to 1;

a rotating step of rotating a remaining sub-image, in response to determining that the number of remaining sub-images is equal to 1 in the second determining step; and in response to determining that the number of remaining sub-images is greater than 1, maintaining a current orientation of the remaining sub-image, the current orientation defined by the image as displayed prior to the receiving step.

14. A non-transitory computer readable medium storing computer readable instructions that, when executed, cause an apparatus to:

display an image on a display unit;

receive first user input for setting of a division line in the image, wherein the first user input includes a first movement path;

determine whether a direction of the first movement path is within a predefined range of a specified direction on the display unit;

in response to determining that the direction of the first movement path is within the predefined range of the specified direction, set a first division line in the image along the first movement path of the user input thereby defining a plurality of first sub-images;

determine whether a rotation condition is satisfied, wherein the rotation condition includes selection of at least one non-rotation operation;

in response to determining that the rotation condition is satisfied, rotate at least one of the plurality of first sub-images by a predetermined range, wherein the at least one of the plurality of first sub-images is displayed on the display unit after the division line is set;

receive second user input for setting of a division line in the at least one of the plurality of first sub-images, wherein the second user input includes a second movement path;

determine whether a direction of the second movement path is within the predefined range of the specified direction on the display unit;

in response to determining that the direction of the second movement path is within the predefined range of the specified direction on the display unit, set a second division line in the at least one of the plurality of first sub-images along the second movement path of the user input thereby defining a plurality of second sub-images; and upon receiving a selection of one of the plurality of second sub-images to be deleted, delete the selected one of the plurality of second sub-images.

15. The non-transitory computer readable medium according to claim 14, wherein the computer readable instructions further cause the apparatus to:

upon receiving a selection of one of the plurality of first sub-images to be deleted, delete the selected one of the plurality of first sub-images.

* * * * *